United States Patent
Orrico et al.

(10) Patent No.: US 8,459,142 B2
(45) Date of Patent: Jun. 11, 2013

(54) REACH ADJUST FOR A HANDLEBAR-MOUNTED LEVER ASSEMBLY

(75) Inventors: James Orrico, Chicago, IL (US); Matt Morris, Chicago, IL (US); Paul Feurstein, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 1033 days.

(21) Appl. No.: 11/689,461

(22) Filed: Mar. 21, 2007

(65) Prior Publication Data

US 2008/0229863 A1 Sep. 25, 2008

(51) Int. Cl.
*F16C 1/10* (2006.01)

(52) U.S. Cl.
USPC .............................. 74/502.2; 74/522; 74/525

(58) Field of Classification Search
USPC ............. 74/502.2, 501.6, 519, 522, 523, 525, 74/489
See application file for complete search history.

(56) References Cited

U.S. PATENT DOCUMENTS

| | | | | |
|---|---|---|---|---|
| 4,084,449 A | * | 4/1978 | Kine | 74/480 R |
| 4,348,916 A | * | 9/1982 | Shimano | 74/489 |
| 4,611,500 A | * | 9/1986 | Nagano | 74/489 |
| 5,537,891 A | * | 7/1996 | Nagano et al. | 74/525 |
| 5,839,544 A | * | 11/1998 | Yamashita | 188/24.19 |
| 6,957,597 B2 | | 10/2005 | Irie | |
| 2005/0097979 A1 | | 5/2005 | Nago | |

FOREIGN PATENT DOCUMENTS

| | | |
|---|---|---|
| DE | 24 34 300 | 1/1976 |
| DE | 94 15 887 U1 | 2/1995 |
| EP | 1 342 655 A | 9/2003 |
| EP | 1 759 979 A | 3/2007 |
| JP | 10 129293 A | 5/1998 |
| JP | 2003 261085 A | 9/2003 |
| WO | WO 2007/026383 | 3/2007 |

* cited by examiner

*Primary Examiner* — Alan Waits
(74) *Attorney, Agent, or Firm* — Milan Milosevic; Lisa Serdynski; Steven Courtright

(57) ABSTRACT

A reach-adjustable lever assembly mounted to a handlebar for actuating one of a gear-change and braking device. The lever assembly generally including a support member, a lever pivotably connected to the support member and a reach adjust mechanism. The reach adjust mechanism includes a follower, a cam and a cam seat for retaining the cam in a current user-selectable position. The follower is fixedly supported on one of the support member and the lever and the cam is rotatably supported on the other of the support member and the lever. The cam has a plurality of user-selectable positions. The lever is rotatably biased toward a rest position to position the cam against the follower. The cam and the follower are configured to provide a different rest position of the lever for each of the user-selectable positions.

7 Claims, 6 Drawing Sheets

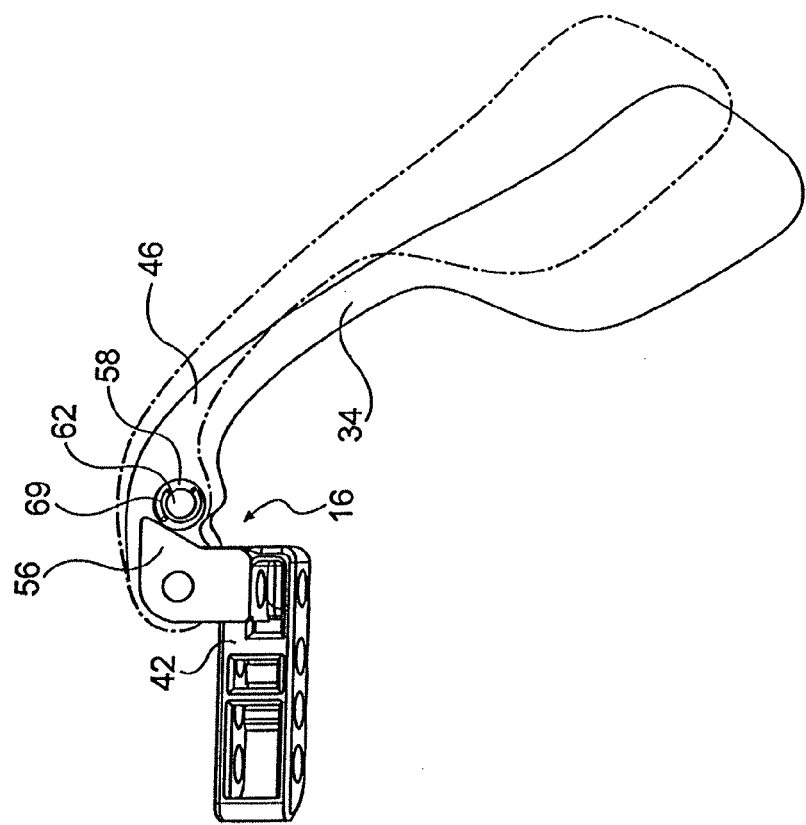
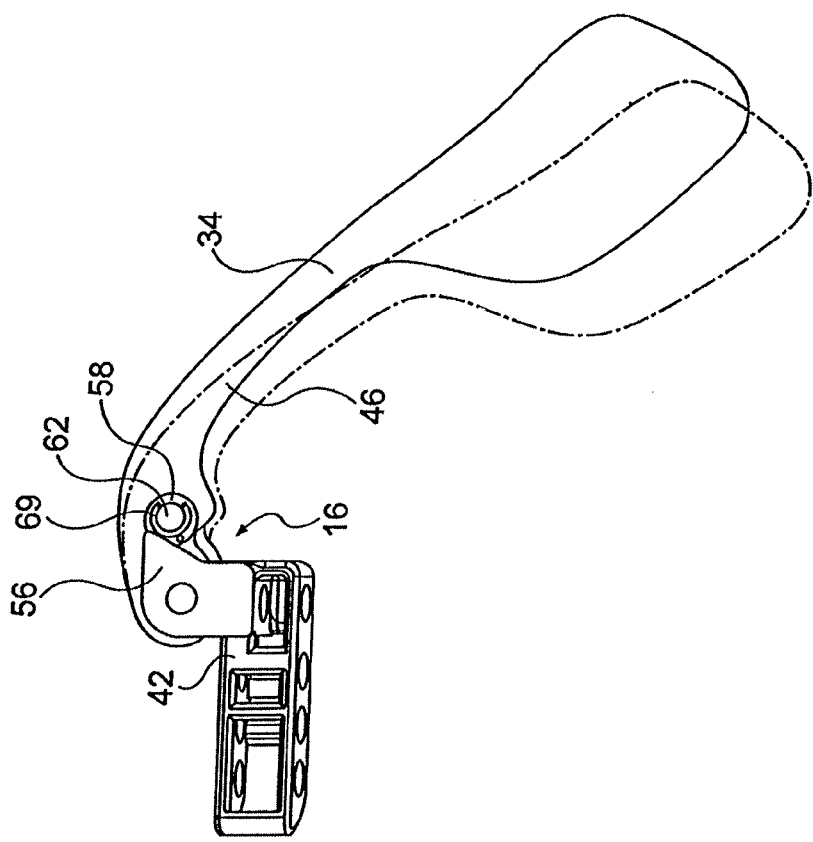

REACH ADJUST FOR A HANDLEBAR-MOUNTED LEVER ASSEMBLY

BACKGROUND OF THE INVENTION

The present invention relates to handlebar-mounted lever assemblies, and more particularly, to a lever assembly that includes a reach adjust mechanism.

Typically, a lever assembly may be a brake lever assembly or a shift lever assembly. These assemblies are mountable to a handlebar for use on a bicycle, and the like, to actuate a control cable extending between the lever assembly and a brake or gear-change device. Alternatively, the lever assembly may be used in a hydraulic brake system or the like. Typically, the distance between the lever and the handlebar, known as the reach, is fixed and set to accommodate an average-sized hand. Accordingly, a fixed-reach lever may be positioned too far from the handlebar for a rider with smaller hands to comfortably reach.

To solve this problem, the lever assembly may include a reach adjust mechanism. One example of a reach adjust mechanism is a removable spacer insertable between the housing and the lever. One disadvantage of the spacers is that they provide only one increment of reach adjust. Another disadvantage is that the discrete spacer may be lost. Another example of a reach adjust mechanism is a screw or bolt threaded directly into the housing and engageable with the lever to position the lever relative to the handlebar. However, when the threads on the housing become worn or stripped, the entire housing has to be replaced. Therefore, there is a need for a lever reach adjust mechanism that overcomes these disadvantages.

SUMMARY OF THE INVENTION

The present invention provides a reach-adjustable lever assembly mountable to a handlebar for actuating one of a gear-change and braking device. The reach-adjustable lever assembly generally includes a support member, a lever and a reach adjust mechanism. The lever is pivotably connected to the support member. The reach adjust mechanism includes a follower, a cam and a cam seat. The follower is fixedly supported on one of the support member and the lever. The cam is rotatably supported on the other of the support member and the lever and has a plurality of user-selectable positions. The cam seat retains the cam in a current user-selectable position. The lever is pivotably biased toward a rest position to position the cam against the follower. The cam and the follower are configured to provide a different lever rest position for each of the user-selectable positions.

In one embodiment of the present invention, the cam seat includes a post having an engaging portion and a non-engaging portion. The cam is positionable on the post between the engaging and non-engaging portions. The engaging portion retains the cam in the current user-selectable position and the non-engaging portion permits rotation of the cam between the user-selectable positions. To prevent rotation between the engaging portion and the cam, the cam includes a non-circular inner surface matingly engageable with a complimentary-shaped non-circular outer surface of the engaging portion. Further, a spring biases the cam toward the engaging portion, while a retaining ring maintains the cam on the post.

These and other features and advantages of the present invention will be more fully understood from the following description of one or more embodiments of the invention, taken together with the accompanying drawings.

BRIEF DESCRIPTION OF THE DRAWINGS

In the drawings:

FIGS. 3a and 3b are side views of a shift lever and the reach adjust mechanism of FIG. 1 showing two rest positions of the shift lever;

DETAILED DESCRIPTION

Figure 1:
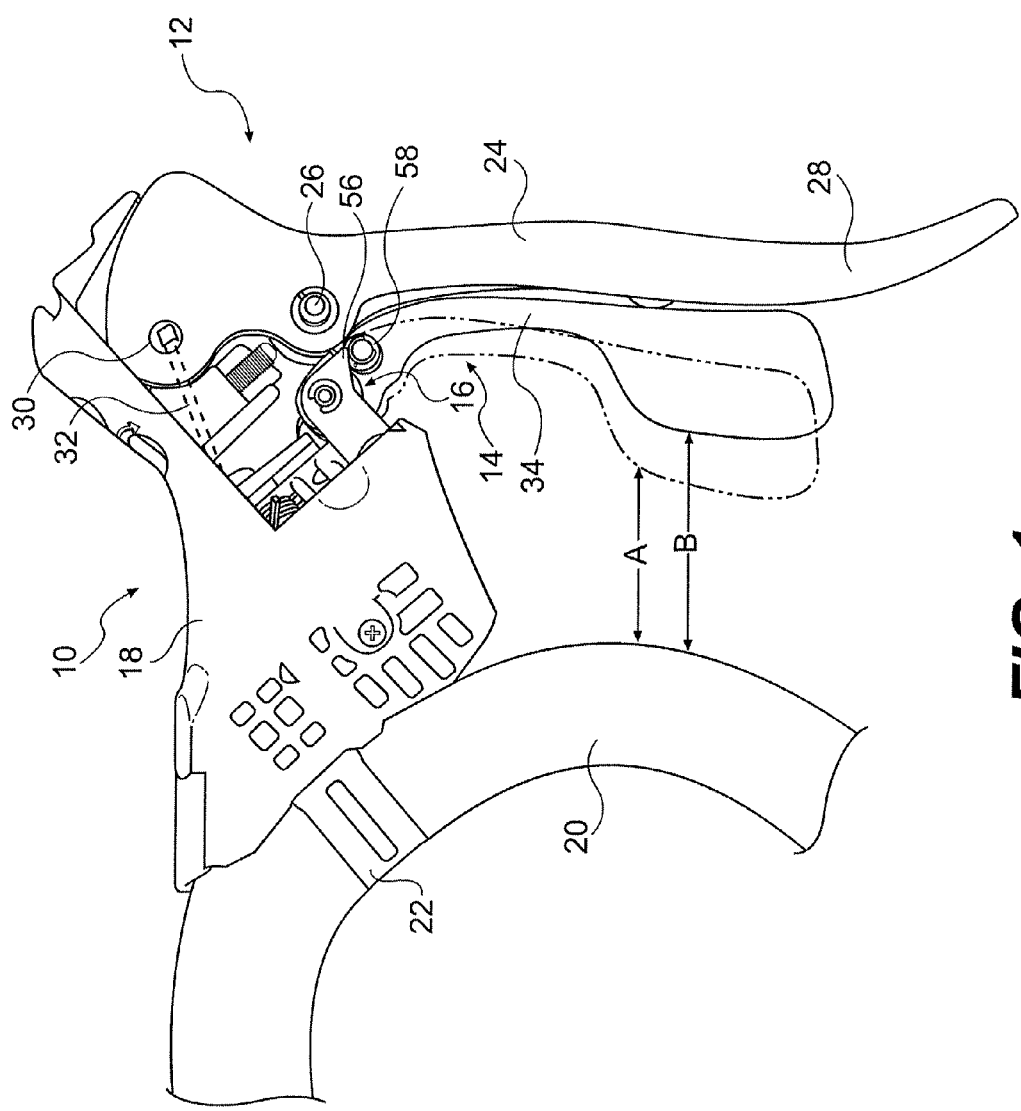
FIG. 1 is a side view of a bicycle control apparatus including a shift lever assembly having a reach adjust mechanism according to one embodiment of the present invention with a housing partially cut away and showing two rest positions of the shift lever relative to a handlebar.
Figure 2:
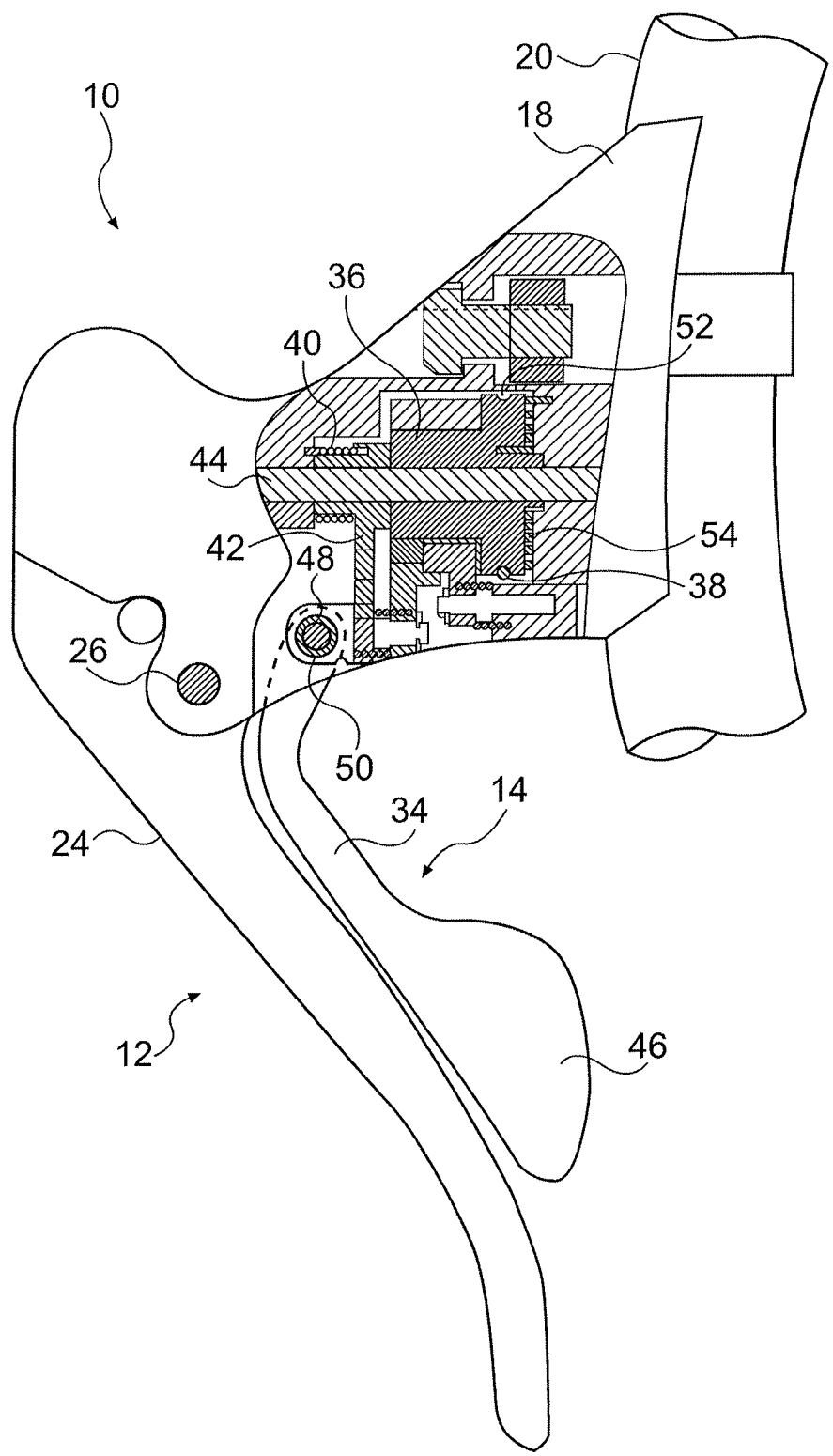
FIG. 2 is a cross-sectional view of the shift lever assembly of FIG. 1.

FIGS. 1 and 2 illustrate a bicycle control apparatus 10 including a brake lever assembly 12 and a shift lever assembly 14. The shift lever assembly 14 includes a reach adjust mechanism 16 according to one embodiment of the present invention. Alternatively, the brake lever assembly 12 may also be configured to include the reach adjust mechanism 16. In this embodiment, the brake lever assembly 12 is integrated with the shift lever assembly 14. Alternatively, the brake lever assembly 12 may be separate from the shift lever assembly 14. The bicycle control apparatus 10 includes a housing 18 that is mountable to a handlebar 20, typically a drop-style handlebar found on a road bike, by a clamp 22. The brake lever assembly 12 includes a brake lever 24 pivotable about a shaft or pivot axis 26 and biased toward a rest position by a preloaded return spring. The brake lever 24 includes a finger grip 28 and a cable seat 30 for receiving one end of a brake cable 32. The other end of the brake cable 32 is connected to a brake device (not shown). The brake lever 24 is pivotable toward the handlebar 20, pulling the brake cable 32 to slow the bicycle.

The shift lever assembly 14 generally includes a shifter lever 34, the reach adjust mechanism 16 and a cable spool 36 for pulling and releasing a control cable 38 connected to a gear change mechanism (not shown) to shift between various gear positions. The gear change mechanism may be a derailleur or other external or internal gear change devices. The shift lever 34 is biased toward a rest position by a preloaded shift lever return spring 40 and preferably tucked behind the brake lever 24. The shift lever 34 includes a first portion 42 rotatably mounted to a shaft or first axis 44, and a second portion 46 preferably paddle-shaped for easy reach by the rider's fingers. The first portion 42 is operatively connected to the cable spool 36 to rotate the spool 36 to shift between gear positions. The second portion 46 of the shift lever 34 is configured to rotate about the shaft 44 along with the first portion 42, the first portion 42 functioning as a support member for the second portion 46. Separately, the second portion rotates about a lever shaft or second axis 48 mounted to the first portion 44 of the shift lever 34. The second axis 48 may lie in a plane substantially perpendicular to the first axis 44. Alternatively, the second axis need not lie in a plane substantially perpendicular to the first axis, for example, it may be parallel to the brake axis 26. The second portion 46 of the shift lever 34 is biased by a preloaded return spring 50 mounted coaxially with the lever shaft 48. In this embodiment, second portion 46 of the shift lever 34 moves with the brake lever 24 when the brake lever 24 is pivoted toward the handlebar 20. Further, the second portion 46 of the shift lever 34 is pivotable toward the handlebar 20 independently of the brake lever 24.

The cable spool 36 is rotatably mounted on the shaft 44 and includes a groove 52 along its periphery, for receiving the control cable 38. The cable spool 36 is biased in the cable-release direction by tension in the control cable 38 and, preferably, by a cable spool return spring 54. The cable spool return spring 54 is disposed between the cable spool 38 and the housing 18.

Figure 4:
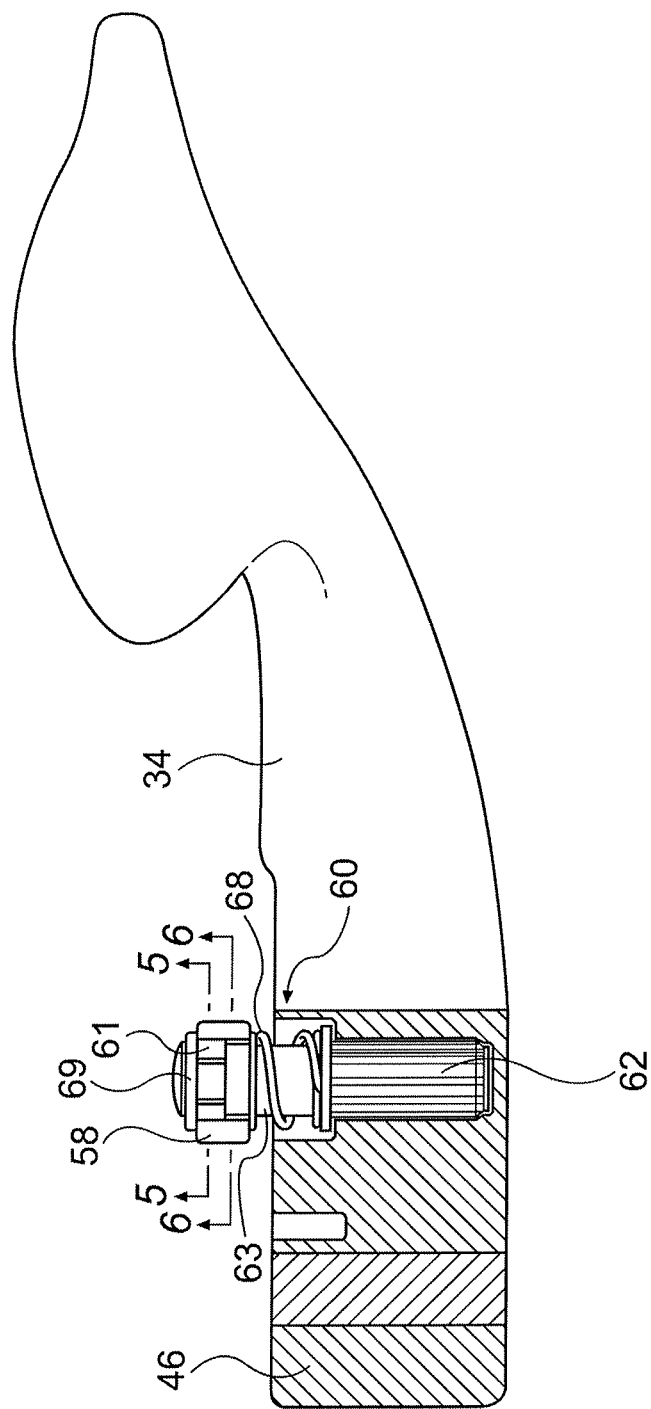
FIG. 4 is a cross-sectional view of the shift lever of FIG. 1 showing a cam rotatably supported by a cam seat supported on the lever.

Looking to FIGS. 3a, 3b and 4, the reach adjust mechanism 16 includes a follower 56, a cam 58 and a cam seat 60 for maintaining the cam 58 in a current user-selectable position. The follower 56, in this embodiment a bracket, is fixedly supported on the first portion 42 of the shift lever 34 at one end, and engages the cam 58 at the other end. The cam 58 has a variable diameter, a different diameter corresponding to each of the user-selectable position. The cam 58 is rotatable to change the user-selectable position of the cam 58, resulting in a different rest position of the shift lever 34 for each user-selectable position.

Figure 5:
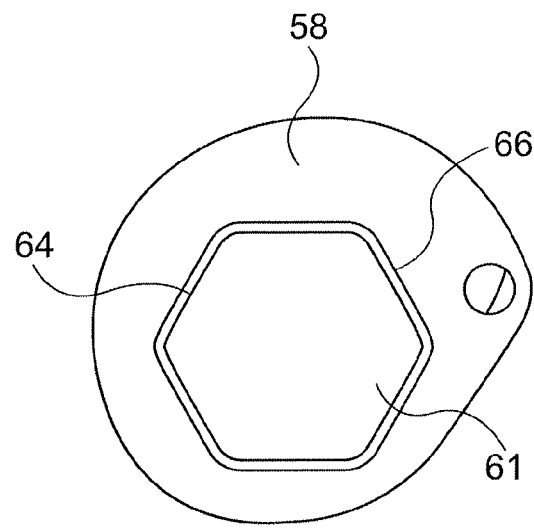
FIG. 5 is a cross-sectional view of the cam engaged with an engaging portion of a post of the reach adjust mechanism taken along line 5-5 of FIG. 4.
Figure 6:
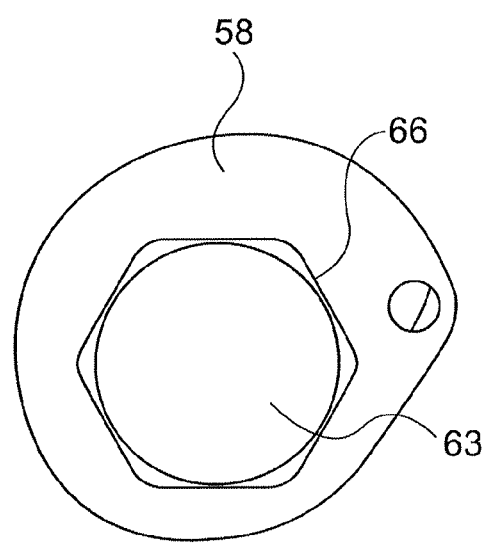
FIG. 6 is a cross-sectional view of the cam engaged with a non-engaging portion of the post of the reach adjust mechanism taken along line 6-6 of FIG. 4.

The cam seat 60 further includes a post 62 that is connected to the shift lever 34. The post 62 includes an engaging portion 61 and a non-engaging portion 63 (see FIGS. 5 and 6). The cam includes a bore for receiving the post 62 therethrough. The cam 58 is user-positionable on the post 62 between the engaging and non-engaging portions 61, 63. The engaging portion 61 maintains the cam 58 in a current user-selectable position and the non-engaging portion 63 permits the rotation of the cam 58 between the user-selectable positions. To prevent rotation between the engaging portion 61 of the post 62 and the cam 58, the engaging portion 61 has a hexagonal outer surface 64 engageable with a mating inner hexagonal surface 66 on the cam 58 (see FIG. 5). Alternatively, the engaging portion 61 and cam 58 may have any non-circular shape that prevents the cam 58 from rotating but allows axial movement of the cam 58 along the post 62. A spring 68, in this embodiment a compression spring, biases the cam 58 toward the engaging portion 61 of the post 62. A retaining ring 69 retains the cam 58 on the post 62.

In this embodiment, the user may adjust the distance between the shift lever 34 and the handlebar 20 by first positioning the cam 58 at the non-engaging portion 63 of the post 62. The user then rotates the cam 58 to a next user-selectable position to position the shift lever 34 closer or further away from the handlebar 20. Counterclockwise rotation of the cam 58 incrementally positions the shift lever 34 closer to the handlebar 20 until the largest cam diameter is reached; further counterclockwise rotation of the cam 58 then drops the shift lever 34 to its farthest position from the handlebar 20. In FIG. 1, the dashed lines show the shift lever 34 in a reduced-reach rest position, a distance A from the handlebar 20. The solid lines show the shift lever 34 in an extended-reach rest position, a distance B from the handlebar 20. FIGS. 3a and 3b also show the shift lever 34 in two rest positions.

Figure 7A:
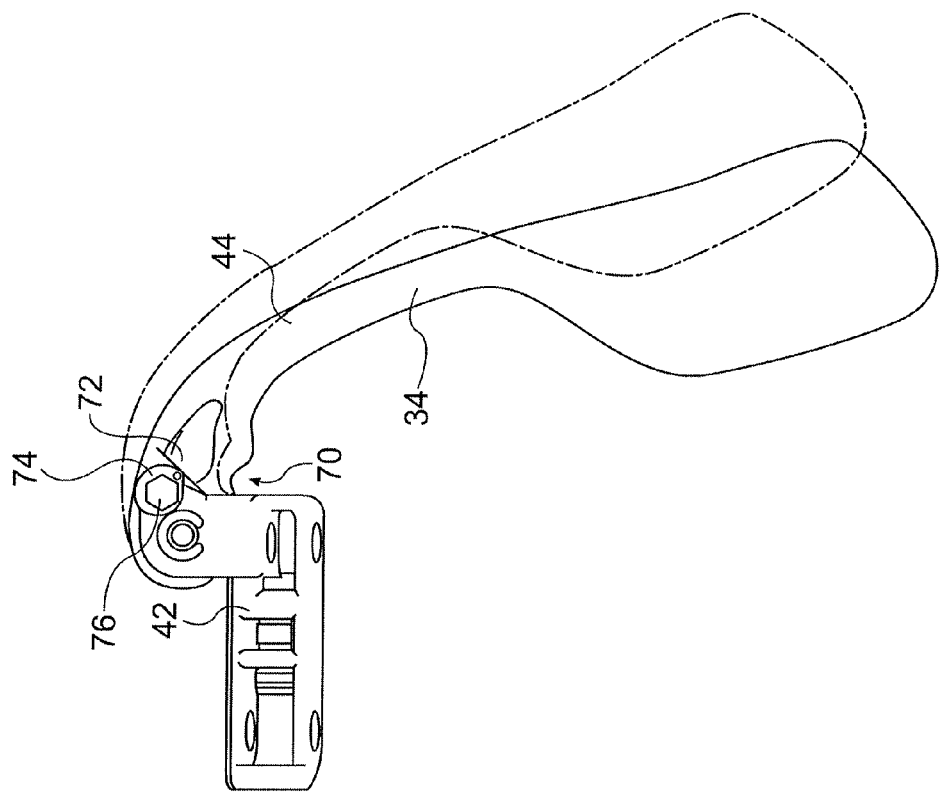
FIGS. 7a and 7b are side views of a shift lever having a reach adjust mechanism according to another embodiment of the present invention showing two rest positions of the shift lever.
Figure 7B:
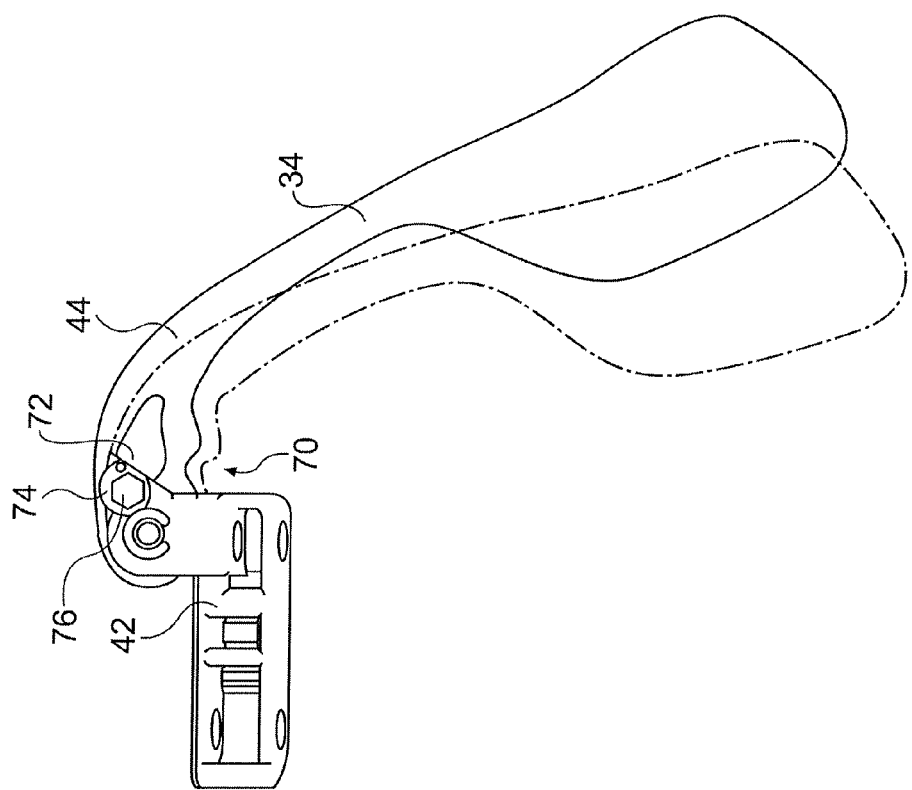

FIGS. 7a and 7b illustrates another embodiment of a reach adjust mechanism 70 for the shift lever 34, similar to the reach adjust mechanism 16 shown in FIG. 1-6, except that a follower 72 is fixedly supported on the shift lever 34 and a cam 74 is rotatably supported on the support member, in this embodiment the first portion 42 of the shift lever 34. The cam seat 76 is supported on the first portion 42 of the shift lever 34. The cam 74 has a variable diameter, a different diameter corresponding to each of the user-selectable position. The cam 74 is rotatable to change the user-selectable position of the cam 74, resulting in a different rest position of the shift lever 34 for each user-selectable position. FIGS. 7a and 7b show the shift lever 34 in two rest positions.

While this invention has been described by reference to one or more preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed:

1. A reach-adjustable lever assembly mountable to a handlebar for actuating one of a gear-change and a braking device, the reach-adjustable lever assembly comprising:
    a support member;
    a lever pivotably connected to the support member; and
    a reach adjust mechanism including:
        a follower fixedly supported on one of the support member and the lever;
        a cam rotatably supported on the other of the support member and the lever, the cam having a plurality of user-selectable positions; and
        a cam seat for retaining the cam in one of the plurality of user-selectable positions, the cam seat including a post supported on the other of the support member and the lever, the post having an engaging portion and a non-engaging portion, the cam alternatively positionable on the post by a sliding axial movement of the cam along the post from one to the other of the engaging and non-engaging portions, the engaging portion shaped for retaining the cam in the current user-selectable position by preventing rotation of the cam when positioned thereon, the non-engaging portion shaped for permitting rotation of the cam between the user-selectable positions, the cam biased toward the engaging portion,
    the lever rotatably biased toward a rest position to position the cam against the follower, the cam and the follower configured to provide a different rest position of the lever for each of the user-selectable positions.

2. A reach-adjustable lever assembly according to claim 1, wherein the follower is fixedly supported on the support member and the cam is rotatably supported on the lever.

3. A reach-adjustable lever assembly according to claim 2, wherein the cam includes a non-circular inner surface matingly engageable with a complimentary-shaped non-circular outer surface of the engaging portion of the post to prevent relative rotation between the cam and the post.

4. A reach-adjustable lever assembly according to claim 3, wherein a spring biases the cam toward the engaging portion of the post.

5. A reach-adjustable lever assembly according to claim 4, wherein a retaining ring retains the cam on the post.

6. A reach-adjustable lever assembly according to claim 5, wherein the spring is positioned between the cam and the one of the support member and the lever.

7. A reach-adjustable lever assembly according to claim 1, wherein the follower is fixedly supported on the lever and the cam is rotatably supported on the support member.

\* \* \* \* \*